(12) United States Patent
Chen et al.

(10) Patent No.: US 8,730,392 B2
(45) Date of Patent: May 20, 2014

(54) FRAME RATE CONVERSION METHOD AND IMAGE PROCESSING APPARATUS THEREOF

(75) Inventors: Chih Wei Chen, Hsinchu County (TW); Chung-Yi Chen, Hsinchu County (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 23 days.

(21) Appl. No.: 13/545,154

(22) Filed: Jul. 10, 2012

(65) Prior Publication Data

US 2013/0038789 A1    Feb. 14, 2013

(30) Foreign Application Priority Data

Aug. 10, 2011  (TW) .............................. 100128602 A

(51) Int. Cl.
*H04N 7/01* (2006.01)
*H04N 11/20* (2006.01)

(52) U.S. Cl.
USPC ........... 348/441; 348/451; 348/452; 348/456; 348/538; 348/E7.012

(58) Field of Classification Search
USPC ............. 348/441, 451, 452, 456, 538, E7.012
See application file for complete search history.

(56) References Cited

U.S. PATENT DOCUMENTS

| 8,115,866 B2* | 2/2012 | Capps ........................... 348/452 |
| 2010/0238348 A1* | 9/2010 | Wang et al. ................... 348/452 |
| 2012/0075524 A1* | 3/2012 | Kim .............................. 348/441 |

* cited by examiner

*Primary Examiner* — Jefferey Harold
*Assistant Examiner* — Omer Khalid
(74) *Attorney, Agent, or Firm* — WPAT, PC; Justin King

(57) ABSTRACT

A frame rate conversion method includes detecting a plurality of input frames to determine an image mode corresponding to the plurality of input frames; performing motion estimation on the plurality of input frames to generate a motion estimation result; and interpolating a plurality of interpolated frames according to the determined image mode, the motion estimation result and the plurality of input frames to generate a plurality of converted output frames, wherein a frame rate of the outputted frames is different from that of the input frames.

16 Claims, 3 Drawing Sheets

Fig.2

FRAME RATE CONVERSION METHOD AND IMAGE PROCESSING APPARATUS THEREOF

CROSS REFERENCE TO RELATED PATENT APPLICATION

This patent application is based on Taiwan, R.O.C. patent application No. 100128602 filed on Aug. 10, 2011.

FIELD OF THE INVENTION

The present invention relates to an image processing mechanism, and more particularly, to a frame rate conversion method and an image processing apparatus thereof.

BACKGROUND OF THE INVENTION

Due to maturity and development of digital display technologies, a current display can support high-rate frame display, e.g., the current display can display an image with 100 or 200 frames every second. However, processing in a film mode, since a film is formed by recording 24/25 frames per second, is different from processing a mere video that is formed by recording and transmitting 50/60 (or 100/200) frames per second. A frame generation rate in film mode does not match with a frame display rate of a display, and changes according to different film modes. If frames filmed in the film mode are converted using an inappropriate frame conversion rate mechanism for frames to be displayed on the display, human eyes may easily recognize defects in the display. Therefore, a flexible image processing mechanism for converting frame rates of various types of film modes to accurately and efficiently conform to a display is extremely important.

SUMMARY OF THE INVENTION

Therefore, one object of the present invention is to provide an image processing apparatus for frame rate conversion and associated methods of operation thereof that are capable of determining a film mode of input frames, and determining a corresponding frame interpolation technique according to the determined film mode, so as to accurately process the frames filmed in different film modes to conform to a particular format for display.

According to an embodiment of the present invention, a frame rate conversion method comprises detecting a plurality of input frames to determine an image mode corresponding to the plurality of input frames; performing motion estimation on the plurality of input frames to generate a motion estimation result; interpolating a plurality of interpolated frames according to the determined image mode, the motion estimation result and the plurality of input frames to generate a plurality of converted output frames, wherein a frame rate of the output frames is different from that of the input frames.

According to another embodiment of the present invention, an image processing apparatus applied for frame rate conversion comprises a mode determining circuit and an image generating circuit. The mode determining circuit detects a plurality of input frames and determines an image mode corresponding to the plurality of input frames. The image generating circuit coupled to the mode determining circuit performs motion estimation on the plurality of input frames to generate a motion estimation result, and interpolates a plurality of interpolated frames according to the determined image mode, the motion estimation result and the plurality of input frames to generate a plurality of converted output frames. A frame rate of the output frames is different from that of the input frames.

The advantages and spirit related to the present invention can be further understood via the following detailed description and drawings.

BRIEF DESCRIPTION OF THE DRAWINGS

FIG. 2 is a schematic diagram of generation of output frames F_OUT according to input frames F_IN via the image processing apparatus illustrated in FIG. 1.

DETAILED DESCRIPTION OF THE PREFERRED EMBODIMENT

Figure 1:
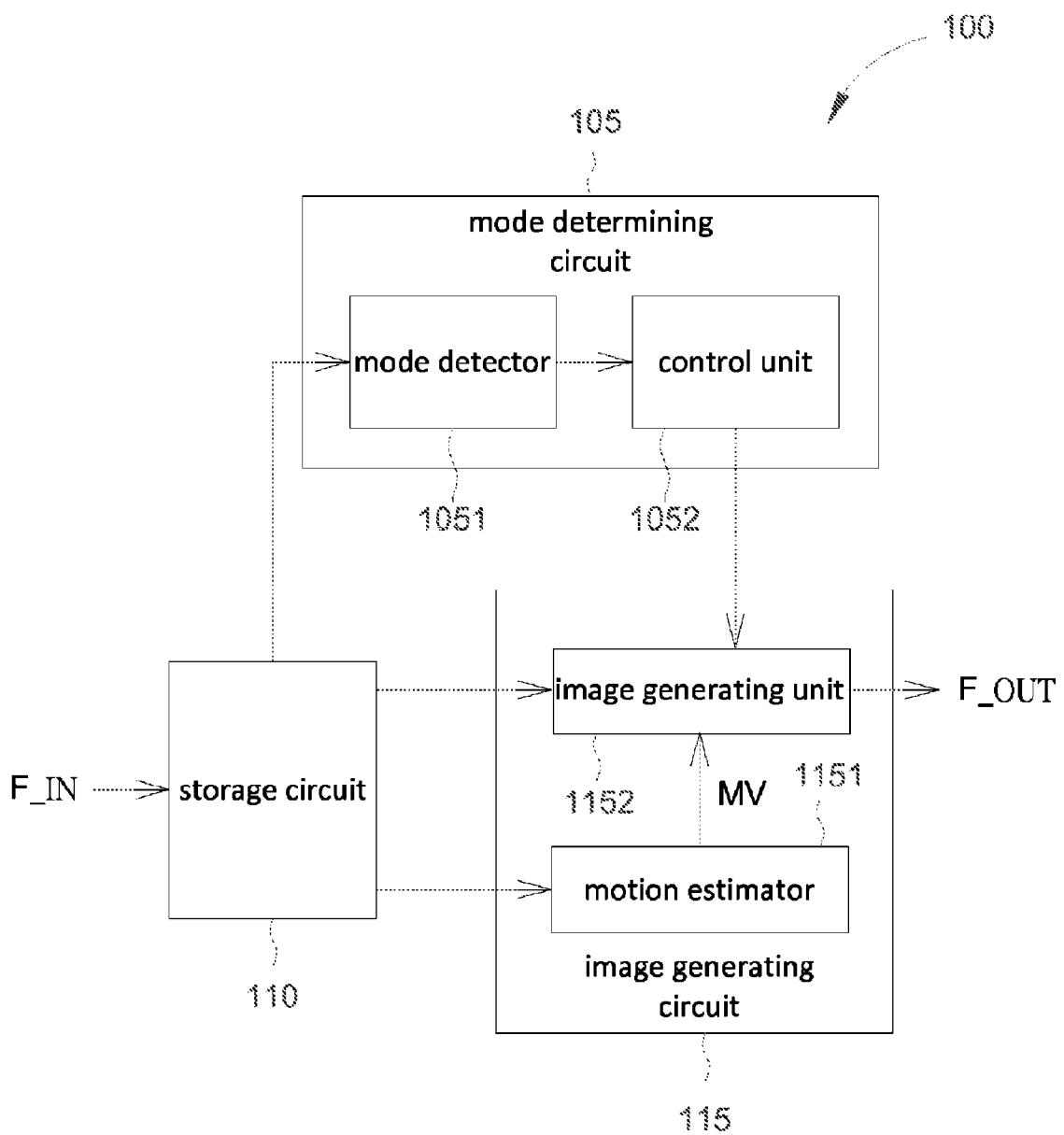
FIG. 1 is a schematic diagram of an image processing apparatus in accordance an embodiment of the present invention.

FIG. 1 is a schematic diagram of an image processing apparatus 100 in accordance with an embodiment of the present invention. The image processing apparatus 100 generates a plurality of output frames F_OUT according to a plurality of input frames F_IN. A frame rate of the output frames F_OUT is designed to be higher than the rate of the input frames; however, it shall not be construed as limiting the present invention. In another embodiment, the frame rate of the output frames F_OUT is designed to be lower than the rate of the input frames F_IN. It is noted that the frame rate of the output frames F_OUT is typically different from that of the input frames F_IN. In other words, the image processing apparatus 100 performs frame rate conversion. The image processing apparatus 100 converts frames in a film mode (corresponding to a frame generation rate of filming a film) to frames to be displayed on a display (corresponding to a frame display rate of the display); however, it shall not be construed as limiting the present invention. Referring to FIG. 1, the image processing apparatus 100 comprises a mode determining circuit 105, a storage circuit 110, and an image generating circuit 115. The mode determining circuit 105 detects image data of the plurality of input frames F_IN to determine an image mode corresponding to the plurality of input frames F_IN. The storage circuit 110 temporarily stores the image data of the input frames F_IN and provides pixel data of the frames to the mode determining circuit 105. In addition, the storage circuit 110 provides the frame data to the image generating circuit 115. The image generating circuit 115 performs motion estimation on the input frames F_IN to generate a motion estimation result MV, and interpolates a plurality of interpolated frames according to the image mode determined by the mode determining circuit 105, the generated motion estimation result MV and the input frames F_IN to generate a plurality of converted output frames F_OUT. In other words, in this embodiment, the current corresponding image mode is determined according to the input frames F_IN, and the foregoing output frames F_OUT are generated according to the corresponding image mode, which is one of a plurality of different film modes, e.g., 3:2 pull down film mode and 2:2 pull down film mode. Different film modes correspond to different frame generation rates. Since a frame display rate of a display is usually fixed, it is inappropriate to convert all frames filmed at one single filming rate into frames to be displayed. Therefore, the image processing apparatus 100 is capable of determining a film mode (switching between two different film modes), and selecting a corresponding frame generation mechanism according to the determined film mode to meet requirements of current users and devices.

For example, the mode determining circuit 105 comprises a mode detector 1051 and a control unit 1052. The mode detector 1051 detects the plurality of input frames F_IN to generate a plurality of frame indexes corresponding to the plurality of input frames F_IN. The control unit 1052 coupled to the mode detector 1051 determines an image mode corresponding to the plurality of input frames according to the plurality of frame indexes, which are for marking whether a corresponding group of consecutive frames are repeated frames. When the mode detector 1051 detects that one group of consecutive frames are repeated frames, the frame indexes corresponding to the frame indexes are defined as the same, i.e., the frame indexes corresponding to non-repeated frames are different. For example, the input frames F_IN filmed in the 3:2 pull down film mode comprise a group of three consecutive repeated frames followed by a group of two consecutive repeated frames (but the two groups of frames are not repeated frames), so that the mode detector 1052 generates a group of three consecutive repeated frame indexes followed by a group of two consecutive repeated frame indexes according to the foregoing image characteristics, and such arrangement information of the frame indexes can indicate that the corresponding input frames are filmed in the 3:2 pull down film mode. In addition, the input frames F_IN filmed in the 2:2 pull down film mode comprise a group of two consecutive repeated frames followed by a group of two consecutive repeated frames (but the two groups of frames are not repeated frames), so that the mode detector 1051 generates one group of two consecutive repeated frames indexed followed by another group of two consecutive repeated frames, and such arrangement information of the frame indexes can indicate that the corresponding input frames are filmed in the 2:2 pull down film mode. When the input frames F_IN comprise a video A filmed in the 3:2 pull down film mode and another video B filmed in the 2:2 pull down film mode, the video A has a group of three consecutive repeated frames and a next group of two consecutive repeated frames, and the video B has a group of a group of two consecutive repeated frames and a next group of two consecutive repeated frames. Therefore, when the mode detector 1051 generates and defines the frames indexes, the frames indexes corresponding to the video A are defined as a group of three consecutive repeated frame indexes and a next group of two consecutive repeated frame indexes, and the frames indexes corresponding to the video B are defined as being a group of two consecutive repeated frame indexes and a next group of two consecutive repeated frame indexes. Accordingly, when the image processing apparatus 100 receives and processes the video A of the input frames F_IN, the control unit 1052 determines that the current frame is in the 3:2 pull down film mode according to the arrangement manner and the number of the frame indexes defined by the mode detector 1051. After that, when the image processing apparatus 100 receives and processes the video B of the input frames F_IN, the control unit 1052 determines that the current frame is in the 2:2 pull down film mode according to the arrangement manner and the number of the frame indexes defined by the mode detector 1051. In other words, the control unit 1052 switches the film mode corresponding to the current frame from a first film mode (i.e., the 3:2 pull down film mode) to a second film mode (i.e., the 2:2 pull down film mode). When a time sequence of the foregoing video B is earlier than that of the video A, in the event that the film mode is switched, the control unit 1052 switches the film mode corresponding to the current frame from the second film mode (i.e., the 2:2 pull down film mode) to the first film mode (i.e., the 3:2 pull down film mode).

It is to be noted that in this example, the first film mode is an M:N pull down film mode, but the invention is not limited to the 3:2 pull down film mode, and the second film mode is an L:N pull down film mode, but the invention is not limited to the 2:2 pull down film mode, where L, M and N are positive integers, and L is different from M. In addition, since the corresponding film mode is determined by the control unit 1052 with reference to the frame indexes generated by the mode detector 1051, the frame indexes are regarded as image mode information of corresponding frames, and the approach of adopting the frame indexes to represent the detected image mode information is only for the purpose of explanation, and shall not be construed as limiting the present invention. In addition, when the mode detector 1051 detects whether a group of consecutive frames are repeated frames by performing pixel data matching, i.e., it is detected whether each of the group of frames are identical to each other. It is to be noted that, in this embodiment, when determining whether two frames are repeated frames, the two frames are determined to be repeated frames while a pixel difference between the two frames is not beyond a predetermined range (i.e., some pixel calculation errors are allowed in this embodiment), and once the pixel difference is beyond the predetermined range, the two frames then are determined as not repeated frames. In other words, when two frames are not completely identical to each other but they have the same image characteristics (i.e., the pixel difference between them is smaller than the predetermined range), the mode detector 1051 determines that the two frames are repeated frames.

Figure 2:
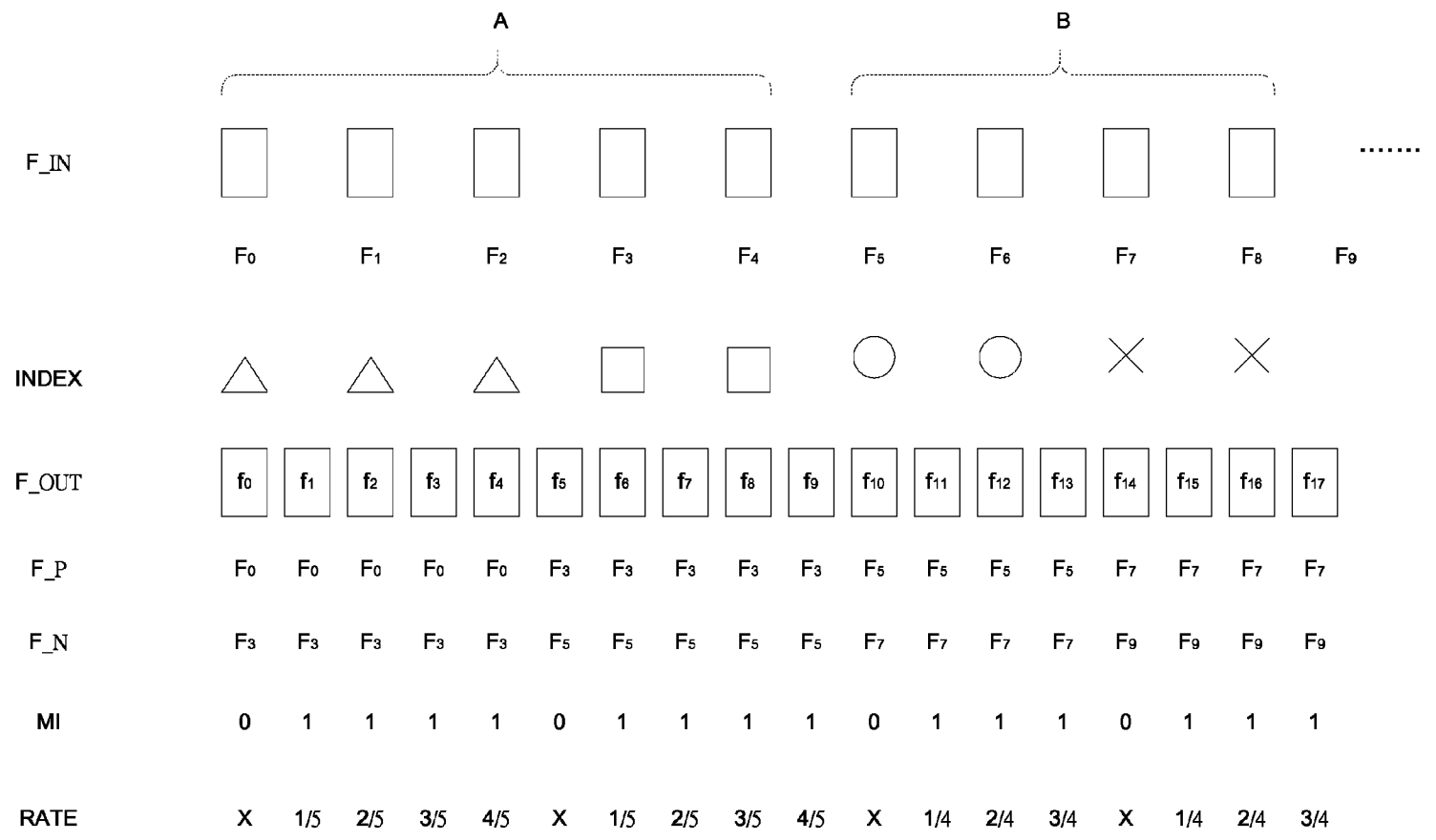

When the control unit 1052 determines the film mode corresponding to the current frame, the determination result of the film mode is outputted to the image generating circuit 115, which performs frame interpolation according to the determined film mode to generate the output frames F_OUT. For example, the image generating circuit 115 comprises a motion estimator 1151 and an image generating unit 1152. The motion estimator 1151 performs image motion estimation on the input frames F_IN to generate a corresponding motion estimation result (i.e., a motion vector). The image generating unit 1152 coupled to the motion estimator 1151 generates to-be-interpolated frames according to the generated motion estimation result to generate the output frames F_OUT. Refer to FIG. 2 showing a schematic diagram of generation of output frames F_OUT according to input frames F_IN via the image processing apparatus illustrated in FIG. 1. The input frames F_IN comprises the video A filmed in the 3:2 pull down film mode and the video B filmed in the 2:2 pull down film mode. The video A comprises a group of three repeated frames (frames 0 to 2) and a next group of two repeated frames (frames 3 to 4), and the video B comprises a group of two repeated frames (frames 5 to 6) and a next group of two repeated frames (frames 7 to 8). Therefore, when the mode detector 1051 defines corresponding frame indexes, with respect to the video A, the frame indexes comprise a group of three identical frame indexes (marked by a triangle "△") and a next group of two identical frame indexes (marked by a box "□"), and with respect to the video B, the defined frame indexes comprise a group of two identical frame indexes (marked by a circle "○") and a next group of two identical frame indexes (marked by an X "□"). Referring to FIG. 2, contents of the frame indexes are represented by INDEX, and frames having the same contents INDEX are repeated frames. Therefore, when the frame indexes are sequentially inputted into the control unit 1052, the control unit 1052 analyzes and determines that the video A is filmed in the 3:2 pull down film mode and the video B is filmed in the 2:2 pull down film mode according to the contents of the frame indexes.

In practical applications, the output frames F_OUT are generated at time points marked by a plurality of rectangles as illustrated in FIG. 2, i.e., a frame rate of the output frames F_OUT is twice that of the input frames F_IN, and the number of the output frames F_OUT is twice that of the input frames F_IN. For example, the video A of the input frames F_IN comprises five frames F0 to F4, and a corresponding video of the output frames F_OUT comprises ten converted output frames f0 to f9. In addition, in this embodiment, the frames that are referred to by the motion estimator 1151 for generating the motion estimation result and a previous frame and a next frame that are referred to by the image generating unit 1152 for performing frame interpolation are respectively represented by F_P and F_N. For example, when a current film mode is the first film mode (i.e., the image processing apparatus 100 receives and processes the video A), with respect to the first to fifth output frames f0 to f4, the motion estimator 1151 calculates a motion estimation result (i.e., an initial motion vector) with reference to the frames F0 and F3 (i.e., the first frame of each of the two groups of repeated input frames), and the image generating unit 1152 performs frame interpolation with reference to a previous input frame and a next input frame, i.e., the frames F0 and F3. Accordingly, when the motion estimator 1151 estimates and outputs the motion estimation result to the image generating unit 1152, the image generating unit 1152 calculates corresponding motion vectors for generating the first to fifth output frames f0 to f4 according to the motion estimation result (e.g., the initial motion vector). Referring to FIG. 2, items MI and RATE respectively represent whether to perform frame interpolation at the given time points to generate the output frames and motion vector rates applied for performing the frame interpolation. When the item MI is "0" at one time point, it indicates that image mixing is performed on the previous input frame F_P and the next input frame F_N instead of frame interpolation to generate the output frame at this time point; when the item MI is "1" at one time point, it indicates that frame interpolation is performed to generate the output frames at this time point. The motion vector rates indicated by the item RATE are proportional to the initial motion vector outputted by the motion estimator 1151. For example, the second to the fifth frames f1 to f4 correspond to the same motion estimation result (i.e., the same initial motion vector) generated by the motion estimation 1051. In order to distinguish by human eyes contents displayed by the second to fifth output frames f1 to f4, the image generating unit 1152 defines the motion vector rates indicated by the item RATE as different values, e.g., the image generating unit 1152 defines the item RATE corresponding to the second to the fifth output frames f1 to f4 as $\frac{1}{5}$, $\frac{2}{5}$, $\frac{3}{5}$ and $\frac{4}{5}$, respectively. After that, frames are interpolated according to the corresponding item RATE, the initial motion vector of the motion estimation result and the previous and next frames F_P and F_N to serve as the output frames f1 to f4. Otherwise, the image generating unit 1152 performs image mixing on the previous input frame F0 and the next frame F3 to generate the output frame f0. It is to be noted that, since the motion vector rates, at the time points, indicated by the item RATE are proportionally added, human eyes can perceive an image that is smoothly moved when observing the interpolated frames without being aware of any abnormal phenomena such as sudden stops or sudden accelerations.

When the current film mode is the first film mode, with respect to the sixth to the tenth output frames f5 to f9, the motion estimator 1151 calculates the motion estimation result (i.e., the initial motion vector) with reference to the input frames F3 and F5 (i.e., the first frame of each of the groups of repeated frames). The image generating unit 1152 performs frame interpolation with reference to a previous frame and a next frame, which are respectively the frames F3 and F5. Therefore, when the motion estimation result is estimated and outputted to the image generating unit 1152, the image generating unit 1152 calculates motion vectors for generating the sixth to tenth output frames f5 to f9. When the sixth output frame f5 is generated, the item MI "0" indicates that frame interpolation is not performed to output the sixth output frame f5; when the seventh to tenth output frames f6 to f9 are generated, the item MI "1" indicates that frame interpolation is performed to output the seventh to tenth output frames f6 to f9. Therefore, the image generating unit 1152 performs image mixing on the previous input frame F2 and the next input frame F5 to generate the output frame f5. Since the seventh to tenth output frames correspond to the same motion estimation result (i.e., the same initial motion vector) generated by the motion estimator 1051, in order to distinguish by human eyes contents displayed by the seventh to tenth output frames f6 to f9, the image generating unit 1152 defines corresponding motion vector rates indicated by the item RATE as different values, e.g., the image generating unit 1152 defines the item RATE corresponding to the seventh to the tenth output frames f6 to f9 as $\frac{1}{5}$, $\frac{2}{5}$, $\frac{3}{5}$ and $\frac{4}{5}$, respectively. After that, interpolated frames are generated according to the corresponding item RATE, the initial motion vector of the motion estimation result and the previous and next input frames F3 and F5 to serve to the output frames f6 to f9. Since the motion vector rates, at the time points, indicated by the item RATE are proportionally added, human eyes can perceive an image that is smoothly moved when observing the interpolated frames without being aware of any abnormal phenomena such as sudden stops or sudden accelerations.

When the current film mode is the second film mode, with respect to the eleventh to fourteenth output frames f10 to f13, the motion estimator 1151 calculates the motion estimation result (i.e., the initial motion vector) with reference to the input frames F5 and F7 (i.e., the first frame of each group of repeated frames). The image generating unit 1152 performs frame interpolation with reference a previous and a next frames, which are the frames F5 and F7, respectively. Therefore, when the motion estimator 1151 estimates and outputs the motion estimation result to the image generating unit 1152, the image generating unit 1152 calculates and generates motion vectors corresponding to the eleventh to fourteenth output frames f10 to f13 according to the motion estimation result. When the eleventh output frame f10 is outputted, the item MI "0" indicates that frame interpolation is not performed to generate the eleventh output frame f10. When the twelfth to fourteenth output frames f11 to f13 are generated, the item "1" indicates that frame interpolation is performed to generate the twelfth to fourteenth output frames f11 to f13. Therefore, the image generating unit 1152 performs image mixing on the previous input frame F5 and the next input frame F7 to generate the output frame f10. Since the twelfth to fourteenth output frames f11 to f13 correspond to the same motion estimation result (i.e., the same initial motion vector), in order to distinguish by human eyes contents displayed by the twelfth to fourteenth output frames f11 to f13, the image generating unit 1152 defines the motion vector rates indicated by the item RATE as different values, e.g., the image generating unit 1152 defines the item RATE corresponding to the twelfth to fourteenth output frames f11 to f13 as ¼, 2/4 and ¾, respectively. After that, the image generating unit 1152 generates the interpolated frames according to the corresponding item RATE, the initial motion vector of the motion estimation result and the previous and next input frames F5 and F7 to serve as the output frames f11 to f13.

When the current film mode is the second film mode, with respect to the fifteenth to eighteenth output frames f14 to f17, the motion estimator 1151 calculates the motion estimation result (i.e., the initial motion vector) with reference to the input frames F7 and F9 (i.e., the first frame of each group of repeated frames). The image generating unit 1152 performs frame interpolation with reference a previous and a next frames, which are the frames F7 and F9, respectively. Therefore, when the motion estimator 1151 estimates and outputs the motion estimation result to the image generating unit 1152, the image generating unit 1152 calculates and generates motion vectors corresponding to the fifteenth to eighteenth output frames f14 to f17 according to the motion estimation result. When the fifteenth output frame f14 is outputted, the item MI "0" indicates that frame interpolation is not performed to generate the fifteenth output frame f14. When the sixteenth to eighteenth output frames f15 to f17 are generated, the item "1" indicates that frame interpolation is performed to generate the sixteenth to eighteenth output frames f15 to f17. Therefore, the image generating unit 1152 performs image mixing on the previous input frame F7 and the next input frame F9 to generate the output frame f14. Since the sixteenth to eighteenth output frames f15 to f17 correspond to the same motion estimation result (i.e., the same initial motion vector), in order to distinguish by human eyes contents displayed by the sixteenth to eighteenth output frames f15 to f17, the image generating unit 1152 defines the motion vector rates indicated by the item RATE as different values, e.g., the image generating unit 1152 defines the item RATE corresponding to the sixteenth to eighteenth output frames f15 to f17 as ¼, 2/4 and ¾, respectively. After that, the image generating unit 1152 generates the interpolated frames according to the corresponding item RATE, the initial motion vector of the motion estimation result and the previous and next input frames F7 and F9 to serve as the output frames f15 to f17.

It is to be noted that, in this embodiment, the video A filmed in the 3:2 pull down film mode and the video B filmed in the 2:2 pull down film mode are described for illustrating the frame interpolation flow; however, it shall not be construed as limiting the present invention. That is, videos filmed in other pull down film modes or videos comprising a plurality of frames can also be processed according to the flow. In addition, in another embodiment, the image generating unit 1152 also adopts other mechanisms to define the rates of the item RATE, i.e., the foregoing motion vector rates (being proportionally added) indicated by the item RATE is only described for illustration purposes, and it shall not be construed as limiting the present invention. In addition, the spirit of the foregoing frame interpolation method is described below. Since different numbers of frames exist during a time interval in an original mode (i.e., when the input frames is in the 3:2 pull down film mode, three frames and other two frames respectively exist during a time interval), i.e., moving speeds of a motion object in the frames are different according to the input frame rate (e.g., in the 3:2 pull down film mode, when the moving objects moves a distance covering 30 pixel points, the moving speed of the motion object of each of the three frames is 5 pixel points per frame, and the moving speed of the motion object of each of the other two frames is 7.5 pixel points per frame), human eyes may perceive abnormal phenomena of sudden stops and sudden acceleration when observing the interpolated images for the reason that the moving speeds of the motion objects of the frames are different. When a certain multiple of output frames are generated, more frames are outputted during a time interval, so that an interval corresponding to each output frame becomes shorter and thus the abnormal phenomena become more apparent. In order to solve this problem, the motion vector is averaged according to different frame statuses (e.g., when five frames are interpolated to three frames, the motion vector is divided with 5, so that each frame is assigned the same moving distance, i.e., the same moving speed/rate) to equalize each motion vector. Results obtained by respectively multiplying the motion vector rates by the previous frame and the next frame are summed up to generate a predetermined output frame (e.g., results of multiplying ⅘ by the input frame F0 and multiplying ⅕ by the input frame F3 are summed up to generate the output frame f1, and results of multiplying ⅗ by the input frame F0 and multiplying ⅔ by the input frame F3 are summed up to generate the output frame f2, wherein a summation of the multiplied motion vector rates of the input frames F0 and F3 is 1).

Figure 3:
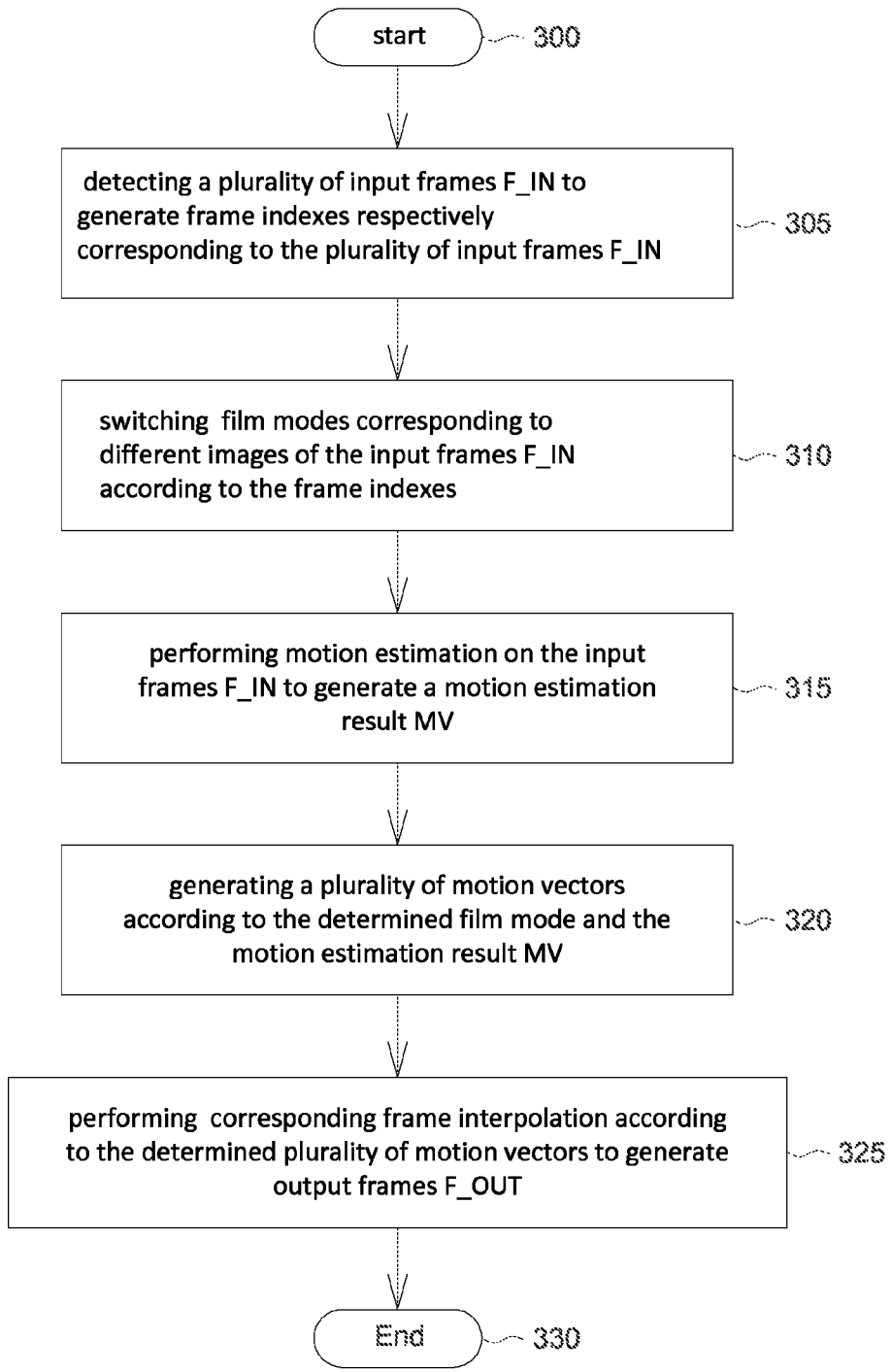
FIG. 3 is a flow chart of operations of the image processing apparatus illustrated in FIG. 1.

In order to better understand the spirit of the present invention, refer to FIG. 3 showing an operation flow of the image processing apparatus 100 as illustrated in FIG. 1. In Step 305, the image processing apparatus 100 detects a plurality of input frames F_IN to generate frame indexes respectively corresponding to the plurality of input frames F_IN. In Step 310, the image processing apparatus 100 determines or switches film modes corresponding to different images of the input frames F_IN according to the frame indexes. In Step 315, the image processing apparatus 100 performs motion estimation on the input frames F_IN to generate a motion estimation result MV. In Step 320, the image processing apparatus 100 generates a plurality of motion vectors according to the determined film mode and the motion estimation result MV. In Step 325, the image processing apparatus 100 performs corresponding frame interpolation according to the determined plurality of motion vectors to generate output frames F_OUT.

In addition, in other embodiments, when the motion estimation result of the motion estimator 1151 indicates a static video, the image generating unit 1152 generates different interpolated frames with reference to different input frames to effectively increase discrimination of images that observed by human eyes. For example, the image generating unit 1152 generates a first interpolated frame with reference to a first frame, of the input frames F_IN, corresponding to an image mode, and generates a second interpolated frame with reference to a second frame, of the input frames F_IN, corresponding to the same image mode. The first frame and the second frame correspond to the same frame indexes. Referring to FIG. 2, taking the video A as an example, the input frames F0 and F1 correspond to the same frame index. In the foregoing embodiment, the image generating unit 1152 performs frame interpolation with reference to the input frames F0 and F3 (respectively regarded as the previous and next input images) to generate different output frames f1 to f4. Once the video A is determined as a static video, the image generating unit 1152 performs frame interpolation with reference to the previous image, i.e., the input frame F1, instead of the input frame F0. In addition, the image generating unit 1152 performs frame interpolation with reference to the next image, i.e., the input frame F3 or F4, instead of the input frame F2. For example, when the output frame f1 is to be outputted, the image generating unit 1152 performs frame interpolation with reference to the input frames F0 and F3 to generate the output frame f1; when the output frame f2 is to be outputted, the image generating unit 1152 performs frame interpolation with reference to the input frames F1 and F2 to generate the output frame f2, or the image generating unit 1152 performs frame interpolation with reference to the input frames F1 and F3 to generate the output frame f2. As for the static video, a majority of the image is not moved, i.e., image contents of two adjacent frames have subtle differences. Therefore, different input frames are adopted to perform frame interpolation so as to generate different adjacent output frames, and accordingly, human eyes can perceive enough image information when observing a frame-rate-converted image. It is to be noted that, in this embodiment, the operation of adopting different input frames to generate different output frames is applied when a certain video is a static video, for example. That is to say, when the video is determined as a dynamic video, different output frame are also generated with reference to different input frames according to the present invention. For example, when the video A is determined as the dynamic video, the image generating unit 1152 performs frame interpolation with reference to the input frames F1 and F2 to generate the output frame f2.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A frame rate conversion method, comprising:
   detecting an image mode for a plurality of input frames by determining an image mode corresponding to a group of consecutive frames of the plurality of input frames with the same image characteristics as a first film mode or a second film mode according to the number of consecutive frames;
   performing motion estimation on the plurality of input frames to generate a motion estimation result; and
   interpolating a plurality of interpolated frames according to the detected image mode, the motion estimation result and the plurality of input frames to generate a plurality of converted output frames, wherein a frame rate of the output frames is different from that of the input frames, comprising:
   when the image mode is the first film mode, calculating a plurality of motion vectors according to the motion estimation result and a first group of frame indexes of the plurality of frame indexes corresponding to the first film mode, with the motion vectors being assigned equal moving distances;
   multiplying the frames corresponding to the first frame indexes by a first rate and multiplying frames corresponding to a second group of frame indexes by a second rate according to the calculated motion vectors and the second group of frame indexes corresponding to the first film mode to respectively generate a plurality of interpolated frames, with a summation of the first rate and the second rate being 1;
   outputting the plurality of converted output frames according to the plurality of input frames and the plurality of interpolated frames; and
   when the image mode is the second film mode, calculating the plurality of motion vectors according to the motion estimation result and the second group of frame indexes of the plurality of frame indexes, corresponding to the second film mode.

2. The method as claimed in claim 1, wherein the step of determining the image mode corresponding to the plurality of input frames comprises:
   detecting the plurality of input frames to generate a plurality of frame indexes respectively corresponding to the plurality of input frames; and
   determining the corresponding image mode of the plurality of input frames according to the plurality of frame indexes.

3. The method as claimed in claim 2, wherein the step of determining the corresponding image mode of the plurality of input frames comprises:
   determining corresponding image modes of the plurality of input frames according to image characteristics indicated by the plurality of frame indexes.

4. The method as claimed in claim 2, wherein the step of detecting the plurality of input frames to generate the plurality of frame indexes respectively corresponding to the plurality of input frames comprises:
   receiving the plurality of input frames;
   determining whether the plurality input frames comprise consecutive frames with same image characteristics, and when there are consecutive repeated frames in the input frames, determining that the consecutive repeated frames have the same image characteristics; and
   defining a plurality of frame indexes corresponding to the consecutive frames as identical indexes.

5. The method as claimed in claim 2, the image mode comprising a first film mode and a second film mode, the method further comprising:
   determining a current image mode as the first film mode when a current first group of consecutive frame indexes of the plurality of frame indexes indicates first image characteristics; and
   determining that the current image mode is switched from the first film mode to the second film mode when a current second group of consecutive frame indexes of the plurality of frame indexes indicates second image characteristics.

6. The method as claimed in claim 1, wherein the step of adaptively determining the image mode corresponding to the plurality of input frames comprises:
   determining an image mode corresponding to a first group of frames of the plurality of input frames as a first film mode; and
   determining an image mode corresponding to a second group of frames of the plurality of input frames as a second film mode, with the first film mode being an M:N film mode, the second film mode being an L:N film mode.

7. The method as claimed in claim 1, wherein the step of interpolating the plurality of interpolated frames to generate the plurality of converted output frames comprises:
   when the motion estimation result indicates a static video:
      generating a first interpolated frame with reference to a first frame, of the plurality of input frames, corresponding to the image mode; and
      generating a second interpolated frame with reference to a second frame, of the plurality of input frames, corresponding to the image mode;
   wherein the first frame and the second frame correspond to the same frame indexes.

8. An image processing apparatus configured to perform frame rate conversion, comprising:

a mode detecting circuit, configured for detecting an image mode for a plurality of input frames by determining an image mode corresponding to a group of consecutive frames of the plurality of input frames with the same image characteristics as a first film mode or a second film mode according to the number of consecutive frames; and an image generating circuit, coupled to the mode determining circuit, configured for performing motion estimation on the plurality of input frames to generate a motion estimation result, and interpolating a plurality of interpolated frames according to the detected image mode, the motion estimation result and the plurality of input frames to generate a plurality of converted output frames, with a frame rate of the output frames being different from that of the input frames, comprising:

when the image mode is the first film mode, calculating a plurality of motion vectors according to the motion estimation result and a first group of frame indexes of the plurality of frame indexes corresponding to the first film mode, with the motion vectors being assigned equal moving distances;

multiplying the frames corresponding to the first frame indexes by a first rate and multiplying frames corresponding to a second group of frame indexes by a second rate according to the calculated motion vectors and the second group of frame indexes corresponding to the first film mode to respectively generate a plurality of interpolated frames, with a summation of the first rate and the second rate being 1;

outputting the plurality of converted output frames according to the plurality of input frames and the plurality of interpolated frames; and when the image mode is the second film mode, calculating the plurality of motion vectors according to the motion estimation result and the second group of frame indexes of the plurality of frame indexes, corresponding to the second film mode.

9. The image processing apparatus as claimed in 8, wherein the mode determining circuit comprises:

a mode detector, for detecting the plurality of input frames to generate a plurality of frame indexes respectively corresponding to the plurality of input frames; and a control unit, coupled to the mode detector, for adaptively determining the image mode corresponding to the plurality of input frames according to the plurality of frame indexes.

10. The image processing apparatus as claimed in claim 9, wherein the control unit adaptively determines image modes respectively corresponding to the plurality of input frames according to image characteristics respectively indicated by the plurality of frame indexes.

11. The image processing apparatus as claimed in claim 9, wherein the mode detector receives a plurality of input frames, determines whether the plurality of input frames comprise consecutive frames having same image characteristics, defines a plurality of frame indexes corresponding to the consecutive frames as the same indexes, and determines a plurality of consecutive repeated frames as repeated frames having same image characteristics when the plurality of consecutive repeated frames are comprised in the plurality of input frames comprise.

12. The image processing apparatus as claimed in claim 9, wherein the image mode comprises a first film mode and a second film mode:

when a current first group of consecutive frame indexes of the plurality of frame indexes indicates image characteristics, the control unit determines that the current image mode as the first film mode; and when it is detected that a second group of consecutive frame indexes indicates second image characteristics, the control unit switches the current image mode from the first film mode to the second film mode.

13. The image processing apparatus as claimed in claim 8, wherein the mode determining circuit adaptively determines an image mode corresponding to a first group of frames of the input frames as a first film mode, and determines an image mode corresponding to a second group of frames of the input frames as a second film mode, and the mode determining circuit switches the current image mode from the first film mode to the second film mode, with the first film mode being an M:N film mode, the second film mode being an L:N film mode, and L, M and N are different positive integers.

14. The image processing apparatus as claimed in claim 8, wherein as for a group of consecutive frames, of the input frames, having the same image characteristics, the mode determining circuit determines an image mode corresponding to the group of consecutive frames as a first film mode or a second film mode according to the number of the group of consecutive frames, and when the image mode is the second film mode, the image generating unit calculates the plurality of motion vectors according to the motion estimation result and a second group of frame indexes, of the plurality of frame indexes, corresponding to the second film mode.

15. The image processing apparatus as claimed in claim 8, wherein the image generating circuit comprises:

a motion estimator, for generating the motion estimation result; and an image generating unit, coupled to the motion estimator, when the image mode is a first film mode, the image generating unit calculates a plurality of motion vectors according to the motion estimation result and a first group of frame indexes, of the plurality of frame indexes, corresponding to the first film mode, respectively generating the plurality of interpolated frames according to the calculated plurality of motion vectors, and outputting the plurality of interpolated frames according to the plurality of input frames and the plurality of interpolated frames.

16. The image processing apparatus as claimed in claim 8, wherein when the motion estimation result indicates a static video, the image generating circuit generates a first interpolated frame with reference to a first frame, of the input frames, corresponding to the image mode, and generates a second interpolated frame with reference to a second frame, of the input frames, corresponding to the image mode, with the first frame and the second frame being corresponding to the same frame indexes.

* * * * *